United States Patent

[11] 3,628,387

[72] Inventors Joseph Gaskell
Wigan;
Terence Hamilton, Shevington, near
Wigan, both of England
[21] Appl. No. 16,194
[22] Filed Mar. 3, 1970
[45] Patented Dec. 21, 1971
[73] Assignee Dobson Gullick Limited, Inc.
Wigan, Lancashire, England
[32] Priority Mar. 15, 1969
[33] Great Britain
[31] 13,728/69

[54] MECHANISMS FOR CONVERTING ANGULAR MOTION TO STRAIGHT LINE MOTION
2 Claims, 2 Drawing Figs.

[52] U.S. Cl. ............................ 74/89
[51] Int. Cl. ............................ F16h 27/04
[50] Field of Search ................. 74/242.16, 89, 52, 99

[56] References Cited
UNITED STATES PATENTS
| | | | |
|---|---|---|---|
| 3,399,582 | 9/1968 | Henry | 74/242.16 |
| 525,694 | 9/1894 | Cruser | 74/242.16 |
| 2,506,736 | 5/1950 | Oschwald | 74/52 |

*Primary Examiner*—William F. O'Dea
*Assistant Examiner*—Wesley S. Ratliff, Jr.
*Attorney*—Berman, Davidson and Berman

ABSTRACT: A tensioning mechanism for a belt or chain particularly a conveyor belt or chain comprises two eccentric devices mounted one within the other and geared together by an epicycliclike gear train. One eccentric device carries a shaft for a wheel around which the belt or chain passes. A member of the epicycliclike gear train has means whereby it can be rotated manually so as to cause relative angular displacement of the eccentric devices and thereby movement of the shaft in substantially a straight line in a tension-adjusting direction for the belt or chain.

MECHANISMS FOR CONVERTING ANGULAR MOTION TO STRAIGHT LINE MOTION

This invention is for improvements in or relating to tensioning mechanisms for a belt or chain.

One application of the invention which is, however, only mentioned by way of example, is to a tensioning device for a conveyor chain or belt, especially the driving or conveying chain of a conveyor of the kind used in mineral mining.

One object of the invention is to provide a tensioning mechanism for a conveyor which, while being easily operable manually, is capable of tensioning a heavy chain such as is to be found in conveyors used in mineral mining. A further object of the invention is to provide a tensioning mechanism which is of particularly compact construction and, therefore, meets a major requirement of equipment to be used in a mine.

According to the present invention there is provided a tensioning mechanism for a belt or chain comprising an outer member mounted for rotation, an inner member mounted eccentrically for rotation in or on said outer member, a shaft or like member adapted to have mounted on it a wheel, pulley or the like around which said belt or chain passes and mounted eccentrically in or on said inner member and means for causing angular displacement of said mechanism, the arrangement being such that said angular displacement results in the shaft moving in substantially a straight line in a tension adjusting direction for the belt or chain.

Preferably the movement of the shaft is not only in a straight line but is also in a direction parallel to the belt or chain.

In one preferred embodiment of the invention the eccentric devices constitute part of an epicyclic like gear train, one eccentric being a sun wheel geared by a planet pinion or pinions, carried by the other eccentric, to a fixed toothed annulus, the or one of said planet pinions being manually adjustable.

One particular embodiment of the invention will now be described by way of example as applied to an endless conveyor chain tensioner.

In the following description reference is made to the accompanying drawings in which.

Figure 1:
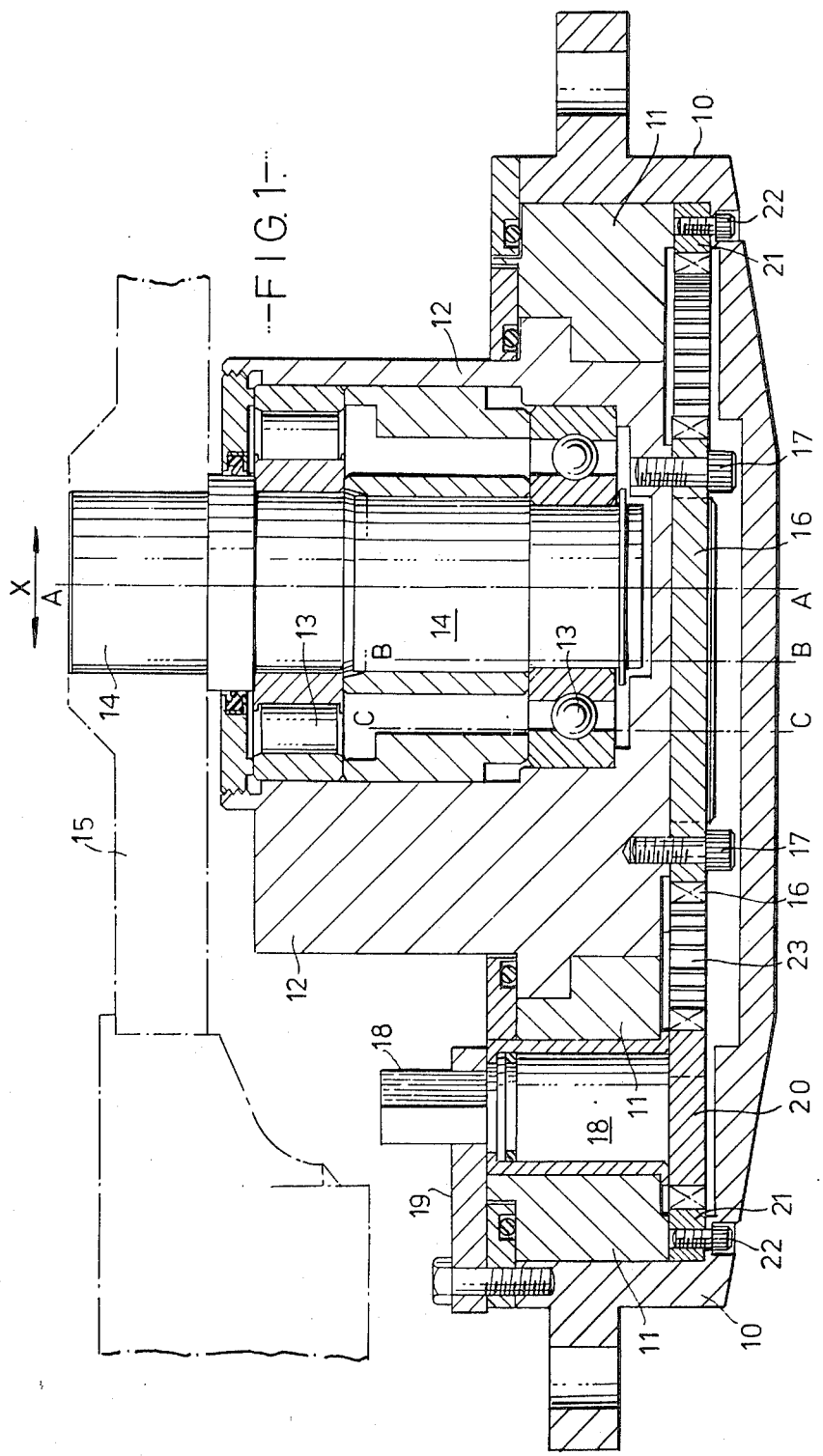
FIG. 1 is a cross-sectional plan view of the tensioning device.
Figure 2:
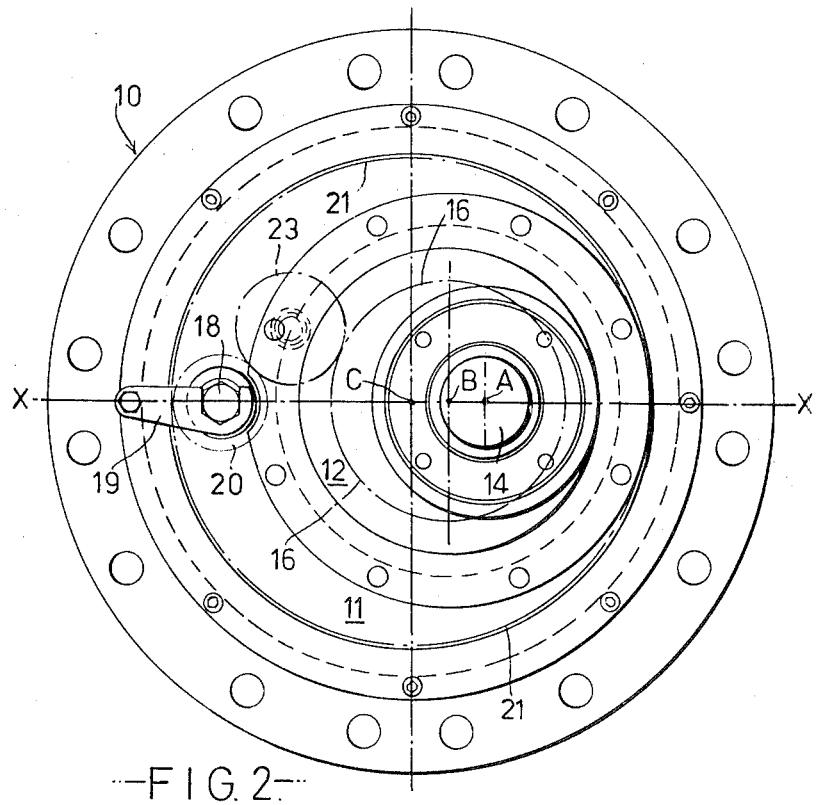
FIG. 2 is a side view of the tensioning device shown in FIG. 1 to a smaller scale.

The tensioning device shown on the drawings comprises a fixed housing or frame 10 having rotatably mounted within it an outer eccentric 11.

Rotatably mounted within the outer eccentric 11 is an inner eccentric 12. The latter has rotatably and eccentrically mounted in it, by means of ball and roller bearings 13, a shaft 14 to which is keyed a chain wheel 15 around which the conveyor chain passes.

A toothed sun wheel 16 is secured to the inner eccentric 12 by means of screws 17.

Eccentrically mounted and rotatable in the outer eccentric 11 is a tension adjusting shaft 18 provided with flats for a spanner or key for turning said shaft. The shaft 18, and thereby the tensioning mechanism, can be locked in various positions of adjustment by means of a locking plate 19 which lockingly embraces said shaft and is fixed to the frame 10. A planet pinion 20 is fixed on the shaft 18 and meshes with the teeth of an internally toothed annulus 21 fixed to the housing or frame 10 by means of screws 22.

A further planet pinion 23 meshes with the planet pinion 20 and the sun wheel 16.

The axis of the shaft 14 is designated AA, the axis of the inner eccentric 11 is designated BB and the axis of the outer eccentric is designated CC.

The gear ratios of the epicyclic gearing comprising the sun wheel 16, the toothed annulus 21 and the planet pinions 20 and 23 has been selected, in this particular example, so that there is a velocity ratio of 1 to 2 between the outer eccentric and the inner eccentric. In order words, the inner eccentric rotates twice about its own axis for each rotation of the outer eccentric about its axis. In the particular case shown on the drawing the sun wheel 16 has 52 teeth, the annulus 21 104 teeth, the pinion 20 20 teeth and the pinion 23 24 teeth.

It will also be noted that the arrangement is such that the inner and outer eccentrics rotate, about their respective axes, in opposite directions.

To effect linear adjustment of the shaft 14 and tensioning of the conveyor chain, the pinion 20 is rotated in an anticlockwise direction about its center by means of the shaft 18. As a result and because the annulus 21 is held stationary, the pinion 20 and shaft 18 will rotate bodily with the outer eccentric 11 in a clockwise direction and at the same time, by the gearing 20, 23, the inner eccentric 11 will be caused to rotate in an anticlockwise direction carrying with it the shaft 14. As a result the axis AA of the shaft 14 will move towards the axis CC horizontally in a straight line as indicated by the line X-X.

Rotation of the pinion 20 clockwise will cause the axis AA to move away from the axis CC horizontally in a straight line thus, if required, tension on the chain may be reduced.

We claim:

1. A tensioning mechanism for a belt or chain comprising a fixed frame or housing, a shaft for a wheel around which the belt or chain passes, an inner eccentric rotatably mounted on said shaft, an outer eccentric rotatably mounted on said inner eccentric and carrying a rotatable tension-adjusting shaft, an internally toothed annulus fixed to said frame or housing of the mechanism, a toothed pinion on said tension-adjusting shaft and meshing with said internally toothed annulus and at least one further toothed pinion gearing said pinion to a gear wheel fixed to the inner eccentric.

2. A tensioning mechanism as claimed in claim 1 wherein a releasable locking member lockingly embraces said tension-adjusting shaft.

* * * * *